Patented Jan. 2, 1951

2,536,114

UNITED STATES PATENT OFFICE 2,536,114

MODIFIED POLYVINYL RESINS

Harold E. Weaver, Pittsburgh, Pa., and Ellis Gray King, Shelton, Wash., assignors to Armstrong Cork Company, Lancaster, Pa., a corporation of Pennsylvania No Drawing. Application November 26, 1946, Serial No. 712,262

9 Claims. (Cl. 260—87.1)

This invention relates to modified polyvinyl resins. More particularly, this invention relates to a process of preparing polyvinyl resins characterized by possessing limited unsaturation by means of controlled decomposition of the resins.

Polyvinyl resins, sometimes referred to as vinyl resins, are prepared by various methods, most of which involve the polymerization of halogen containing vinyl derivatives, such as vinyl chloride, vinyl bromide, vinyl chloracetate, and the like, either alone or in the presence of other vinyl compounds, such as vinyl acetate. Generally speaking, the most widely used of this class of resins are those resulting from the polymerization of vinyl chloride and those resulting from the conjoint polymerization of a mixture containing approximately 85% vinyl chloride and approximately 15% vinyl acetate.

Vinyl resins prepared as indicated above find wide application as ingredients of coating compositions and molding compositions. Generally speaking, however, the bulk of the vinyl resins available are susceptible to flow at elevated temperatures and under pressure. This property of vinyl resins is a serious handicap in the use of such materials in various molding compositions.

Among the methods which have been proposed for the improvement of vinyl resins by eliminating therefrom the susceptibility of resin to flow at elevated temperature is that involving reacting a plasticized vinyl resin with alkali metal sulfides. While such treatment does improve the characteristics of the resin in that the resin is made less susceptible to flow at elevated temperatures, the agents required possess a strong odor and, in many cases, do not completely react with the resin, thereby leaving an alkaline residue present which is water-soluble.

In the previous attempts to create unsaturation in polyvinyl chloride resins, substantially all of the chlorine contained in the resin molecule has been removed; such complete dechlorination results in a hard, black, infusible residue, which has little or no utility.

It is, accordingly, the object of this invention to provide a modified vinyl resin characterized by high resistance to heat and pressure.

It is a further object of this invention to provide a process of preparing modified vinyl resins which are resistant to flow under elevated temperature conditions.

Still another object of this invention is the provision of a method of partially decomposing vinyl resins to obtain readily curable unsaturated resins.

A further object of this invention is the provision of a method of partially decomposing vinyl resins to produce limited unsaturation therein, whereby a curable product resistant to heat is obtained.

These and other objects of this invention will become apparent to those skilled with the art upon becoming familiar with the following description.

We have found that vinyl resins, such as polyvinyl chloride and resins obtained by the conjoint polymerization of vinyl chloride and vinyl acetate, may be partially decomposed to obtain an unsaturated material which may be vulcanized in a manner similar to rubber to produce cured compositions suitable for gaskets, food closure liners, and other similar adaptations.

In accordance with our invention, controlled quantities of hydrogen halides, such as hydrogen chloride in the case of polymers of vinyl chloride, are split off from the polymers by subjecting the polymers to a heat treatment in the presence of an alkaline substance. The alkaline substance reacts with the liberated hydrogen halide and thereby prevents excessive decomposition of the resins. The presence of an alkaline material is essential in that strong acids such as HCl catalyze the decomposition of vinyl polymers.

While the decompostion of vinyl resins in accordance with our invention may be carried out in a number of ways, such as a dry state or by subjecting a suspension of resin to elevated temperature in the presence of an alkaline material, particularly advantageous results are obtained by subjecting a solution of resin to elevated temperatures in the presence of an alkaline agent.

Generally speaking, solutions which may be treated in accordance with our invention are comparatively dilute, in that highly concentrated vinyl resin solutions tend to be viscous, thereby increasing the difficulty of properly handling the solution. We have found that vinyl resin solutions containing less than 20% by weight of resin may be readily processed. Particularly advantageous results are obtained by treating solutions containing 10% or less resin by weight.

Generally speaking, the alkaline agent to be utilized is advantageously a strong alkali such as potassium hydroxide, sodium hydroxide, lithium hydroxide, and the like. However, if desired, salts of strong alkalis and weak acids such as potassium carbonate, sodium carbonate, and the like may be utilized.

In obtaining the controlled unsaturation desired, care should be exercised during the treatment of the resins to insure that the temperature conditions are maintained between approximately 90 and 130° C. during decomposition. If temperatures greater than 130° C. are employed, the products tend to fuse and become highly discolored. While any suitable method of attaining the desired temperature may be employed, it is particularly advantageous to utilize a system involving raising the temperature to the desired end in stages. For instance, a resin solution may be subjected to a temperature in the order of 90° C. for a given period of time, following by a temperature of 100° C. for a further period of time, and finally by subjecting the solution to the desired end temperature for a period of time sufficient to give the desired unsaturation.

We have found that the temperature and time of treatment should be such as to give a product having an iodine value of less than 60. When products having a greater unsaturation as evidenced by a higher iodine value are obtained, the properties of such products, such as color and the like, are much less desirable. Particularly advantageous results may be obtained by controlling the decomposition to produce a resin having an iodine value of less than 24. While the amount of unsaturation, as indicated by the iodine value, may be varied depending upon the particular field in which it is to be employed, generally speaking, it is desirable to control the decomposition to obtain resins having an iodine value of at least 10.

It is particularly important in the practice of our invention to maintain the solution of resin on the alkaline side during the decomposition thereof, in that undesirable products may result should there be insufficient alkali present to accomplish this end. The percentage of alkaline material present in the solution will, of course, vary depending upon the conditions of decomposition. When conditions are such that a substantial quantity of hydrogen chloride is split off from the resin, a substantial quantity of alkali, at least sufficient to neutralize the hydrogen chloride, must be present in the reaction mixture, otherwise a highly discolored product is obtained.

Following the decomposition of the resin, the alkaline material is advantageously separated therefrom by any suitable means such as washing and the resulting unsaturated resin is cured at elevated temperatures.

Curing of the unsaturated resin is effected to advantage at temperatures of about 130° to 150°. If desired, higher or lower curing temperatures may be used, but we have obtained particularly advantageous results by effecting cures in the above indicated ranges. Curing may be facilitated by means of a curing catalyst such as benzoyl peroxide, diacetyl peroxide and the like.

The time required to effect a cure of the unsaturated resins in accordance with our invention may vary, depending, among other things, upon the temperatures employed. Generally speaking, from one-half to two hours is sufficient.

Our invention may be more readily understood by reference to the following specific examples:

Example I

Six grams of a vinyl resin obtained by the conjoint polymerization of a mixture containing 85% vinyl chloride and 15% vinyl acetate was dissolved in "Cellosolve" (2-ethoxy ethanol). The solution also contained 0.18 grams of potassium carbonate per gram of resin. The solution was heated for 30 minutes at 130° C., at the end of which period only one phase existed, which exhibited a bright yellow color. The product was precipitated by pouring the solution in a fine stream into a volume of water 30 times the volume of the solution. After washing, the precipitate was treated with ethyl alcohol. The resin was dried over night in a vacuum dessicator over sulfuric acid without discoloration. The dried material was very soluble in chloroform and it had an iodine number of 20.6.

Example II

Fifty grams of a vinyl resin obtained by the conjoint polymerization of a mixture containing 85% vinyl chloride and 15% vinyl acetate was placed in a 2-liter 3-neck flask together with 450 grams of "Cellosolve" and 9 grams of potassium carbonate. Nitrogen was passed into the equipment as the reaction mixture was heated through the following cycle:

| Total Time | Temperature |
|---|---|
| Minutes | ° C. |
| 16 | 89 |
| 23 | 117 |
| 25 | 120 |
| 30 | 130 |
| 39 | 130 |

The reaction mixture changed to a yellowish-orange color during this heat treatement. After cooling, it was filtered through a Buchner funnel to remove inorganic salts, and the resin was precipitated by the addition of water. The product was washed, ground in methyl alcohol, and dried several days under vacuum at 45° C. It had a light canary yellow color and an iodine number of 14.7.

Example III

The modified resin obtained in accordance with the procedure outlined in Example II was milled with plasticizer, micronized slate, calcium carbonate, and Luperco A (benzoyl peroxide on calcium sulfate) using the following quantities:

| | |
|---|---|
| Resin | 70.0 |
| Santicizer B-16 (butyl phthalyl butyl glycollate) | 30.0 |
| Micronized slate | 100.0 |
| Calcium carbonate | 2.0 |
| Luperco A | 1.4 |

This formulation heated up on the mill more definitely than did straight vinyl resin similarly formulated.

Jar rings were molded from the composition of Example III and from a similarly formulated composition utilizing a straight vinyl resin in place of the modified vinyl resin. The straight vinyl resin composition was molded at 200 lbs. per square inch and 15 lbs. steam pressure. The composition of Example III was heated under pressure at 130° C. for 30 minutes to effect a cure. The samples thus produced were then placed on jars filled at 180° F. and processed for 10 minutes at 15 lbs. steam pressure. The ring prepared from the composition containing straight vinyl resin flowed to the extent that the rings were almost cut through. The ring prepared from compositions containing the modified vinyl resin showed little or no flow and held a vacuum of 20 inches. This ring retained only a slight deformation from the bottle lip.

Throughout the specification reference has been made to iodine values as indicating the unsaturation obtained in the practice of our invention.

These iodine values have been determined according to the method of Von Mikusch & Frazier, Industrial and Engineering Chemistry. Anal. Ed. 13, 782 (1941). Because of the low unsaturation, 2 gram samples of the treated resin have been used. The experimental procedure in determining the iodine values listed above is as follows:

Accurately weigh 2.0 grams of treated vinyl resin and transfer to a clean, dry 500 cc. iodine flask. Add 160 cc. of chloroform. After sample has dissolved, add an exact quantity (about 25 cc.) of 0.32 N iodine bromide solution from a constant volume pipette, swirl and place in a water bath at 20° C. After one hour, add 20 cc. of 15% potassium iodide solution, washing stopper and neck, and titrate in the usual manner, using starch indicator at the end point. Blank determinations with 160 cc. chloroform are carried out in the same manner.

The iodine value is calculated as follows:

$$I.V. = \frac{100(A-B)C}{D}$$

where

A=cc. of sodium thiosulfate used for blank
B=cc. of sodium thiosulfate used for sample
C=g. of iodine equivalent to 1 cc. of sodium thiosulfate solution
D=weight of sample in grams.

As brought out before, the modified vinyl resins prepared in accordance with our invention showed greatly reduced flow characteristics. The resins thus produced polymerized or cross linked so rapidly that the modified and compounded resins showed greatly decreased flow even without conventional curing agents.

The resins so obtained may be utilized in a wide variety of fields wherein such properties are desirable. For example, they may be utilized in the production of gaskets, lining material for closures, and the like. In preparing molding compositions from resins prepared in accordance with our invention, the resin may be readily compounded with various fillers such as chalk, slate, diatomaceous earth, iron oxide, pumice, and the like.

While our invention has been described with reference to certain specific examples and with reference to certain particular embodiments, it is to be understood that the invention is not limited thereby. Therefore, changes, omissions, substitutions, and/or modifications may be made without departing from the spirit of the invention as defined in the appended claims, which are intended to be limited only as required by the prior art.

We claim:

1. A method of preparing a modified vinyl resin which comprises heating a halogen containing vinyl resin at a temperature between 90° and 130° C. in the presence of an alkaline material of the group consisting of alkali metal hydroxides and salts of said hydroxides with weak acids while maintaining the reaction mass alkaline until said resin possesses an iodine value of less than 60, separating the partially decomposed resin from the reaction mass and heating said partially decomposed resin to effect curing.

2. A method of improving the heat resistance of a vinyl resin obtained by the polymerization of a vinyl halide, which comprises heating a solution of said resin in the presence of an alkaline material of the group consisting of alkali metal hydroxides and salts of said hydroxides with weak acids at a temperature between 90° and 130° C. while maintaining said solution alkaline until said resin exhibits an iodine value between 10 and 60, separating the partially decomposed resin from said solution and curing said partially decomposed resin.

3. A method of preparing a vinyl resin characterized by increased resistance to flow which comprises forming a dilute alkaline solution of a polymer of vinyl chloride, heating said dissolved polymer at a temperature between 90° and 130° C. in the presence of an alkaline material of the group consisting of alkaline metal hydroxides and salts of said hydroxides with weak acids while maintaining said solution alkaline to produce a polymer having an iodine value between 10 and 60, separating the partially decomposed resin from said solution and heating the resulting partially decomposed resin to a temperature sufficient to effect curing.

4. A process of preparing a modified vinyl resin characterized by increased resistance to flow which comprises dissolving a polymer of vinyl chloride in a solution containing an alkaline material of the group consisting of alkali metal hydroxides and salts of said hydroxides with weak acids, heating the resulting solution to a temperature between 90° and 130° C. while maintaining said solution alkaline, thereby obtaining a resin having an iodine value between 10 and 60, while maintaining said solution on the alkaline side, separating from the resin decomposition products formed during said heating, and heating the resulting partially decomposed resin at a temperature between approximately 130° C. to 150° C.

5. A method of improving the heat resistance of a vinyl resin obtained by the polymerization of vinyl chloride which comprises heating said resin at a temperature between 90° and 130° C. under alkaline conditions in the presence of an alkaline material of the group consisting of alkali metal hydroxides and salts of said hydroxides with weak acids to obtain a resin having sufficient unsaturation to give an iodine value between 10 and 60, separating said unsaturated resin from the water soluble components in the reaction mass, drying said unsaturated resin and curing said unsaturated resin by the application of heat.

6. A process of improving the heat resistant qualities of a copolymer of vinyl chloride and vinyl acetate which comprises heating said copolymer in an alkaline solution at a temperature between 90° and 130° C. in the presence of an alkaline material of the group consisting of alkali metal hydroxides and salts of said hydroxides with weak acids to produce unsaturation in said copolymer sufficient to give an iodine value between 10 and 60, separating said partially decomposed copolymer from the reaction mass and heating said partially decomposed copolymer to a temperature between 130° and 150° C.

7. A modified vinyl resin having decreased flow characteristics produced by the process of claim 1.

8. A modified vinyl resin having increased resistance to flow at elevated temperature and pressure which comprises the product obtained by heating a polymer of vinyl chloride in the presence of an alkaline material of the group consisting of alkali metal hydroxides and salts of said hydroxides with weak acids at a temperature between 90° and 130° C. while maintaining the reaction mass alkaline to produce a material having an iodine value between 10 and 60, separating the resulting material and heating said separated material to a temperature of 130° to 150° C.

9. A modified vinyl resin characterized by increased resistance to flow at elevated temperature which comprises the product obtained by heating a copolymer of vinyl chloride and vinyl acetate at a temperature between 90° and 130° C. in the presence of an alkaline material of the group consisting of alkali metal hydroxides and salts of said hydroxides with weak acids to obtain a copolymer possessing unsaturation sufficient to give an iodine value between 10 and 60, separating the thus heated material and curing said separated material at a temperature between 130° and 150° C.

HAROLD E. WEAVER.
ELLIS GRAY KING.

REFERENCES CITED

The following references are of record in the file of this patent:

UNITED STATES PATENTS

| Number | Name | Date |
| --- | --- | --- |
| 2,304,637 | Hardy | Dec. 8, 1942 |
| 2,365,400 | Fikentscher | Dec. 19, 1944 |
| 2,387,571 | Fikentscher | Oct. 23, 1945 |
| 2,410,775 | Cox et al. | Nov. 5, 1946 |
| 2,419,166 | Rogers, Jr. et al. | Apr. 15, 1947 |